United States Patent [19]

Sterzer

[11] 4,450,550
[45] May 22, 1984

[54] PICKUP CIRCUIT FOR VIDEO DISC INCLUDING DUAL-GATE FET WITH INJECTED RF

[75] Inventor: Fred Sterzer, Princeton, N.J.

[73] Assignee: RCA Corporation, New York, N.Y.

[21] Appl. No.: 307,023

[22] Filed: Sep. 30, 1981

[51] Int. Cl.³ ............................................. G11B 9/06
[52] U.S. Cl. ...................................... 369/126; 369/129
[58] Field of Search .................. 369/126, 129; 358/342

[56] References Cited

U.S. PATENT DOCUMENTS

| | | |
|---|---|---|
| 1,590,399 | 6/1926 | Tykocinski-Tykociner . |
| 3,806,668 | 4/1974 | Hilliker ................................ 369/126 |
| 3,842,194 | 10/1974 | Clemens ........................... 178/6.6 A |
| 3,920,930 | 11/1975 | Sobczyk ............................. 369/126 |
| 3,969,756 | 7/1976 | Palmer et al. ............................ 358/4 |
| 4,312,013 | 1/1982 | Lang et al. ........................... 369/126 |
| 4,320,491 | 3/1982 | Rustman ............................. 369/126 |

FOREIGN PATENT DOCUMENTS

| | | |
|---|---|---|
| 924765 | 7/1950 | France . |
| 153300 | 2/1922 | United Kingdom . |
| 354341 | 8/1931 | United Kingdom . |
| 1410015 | 10/1975 | United Kingdom . |

OTHER PUBLICATIONS

Kawamoto et al., RCA Technical Notes TN No. 1210, Mailed 7/21/78, 3 sheets, Microwave Apparatus to Detect Small Capacitance Changes at 2.45 GHz.

Primary Examiner—Raymond F. Cardillo, Jr.
Attorney, Agent, or Firm—E. M. Whitacre; J. S. Tripoli; J. E. Roehling

[57] ABSTRACT

A stylus, having a conductive electrode, is arranged to follow a spiral groove on a disc in a video disc player. Video and audio information are recorded in the bottom of the groove as relief variations. When relative motion is established between the stylus and the groove, the spacing between the stylus electrode and relief variations provide capacitance variations representative of the recorded video and audio. A dual-gate field-effect transistor is used in a pickup circuit to detect signals related to these capacitance variations. One gate of the transistor is coupled to the stylus electrode to detect capacitance variations while the other gate is coupled to a local oscillator to modulate the detected capacitance variations.

8 Claims, 1 Drawing Figure

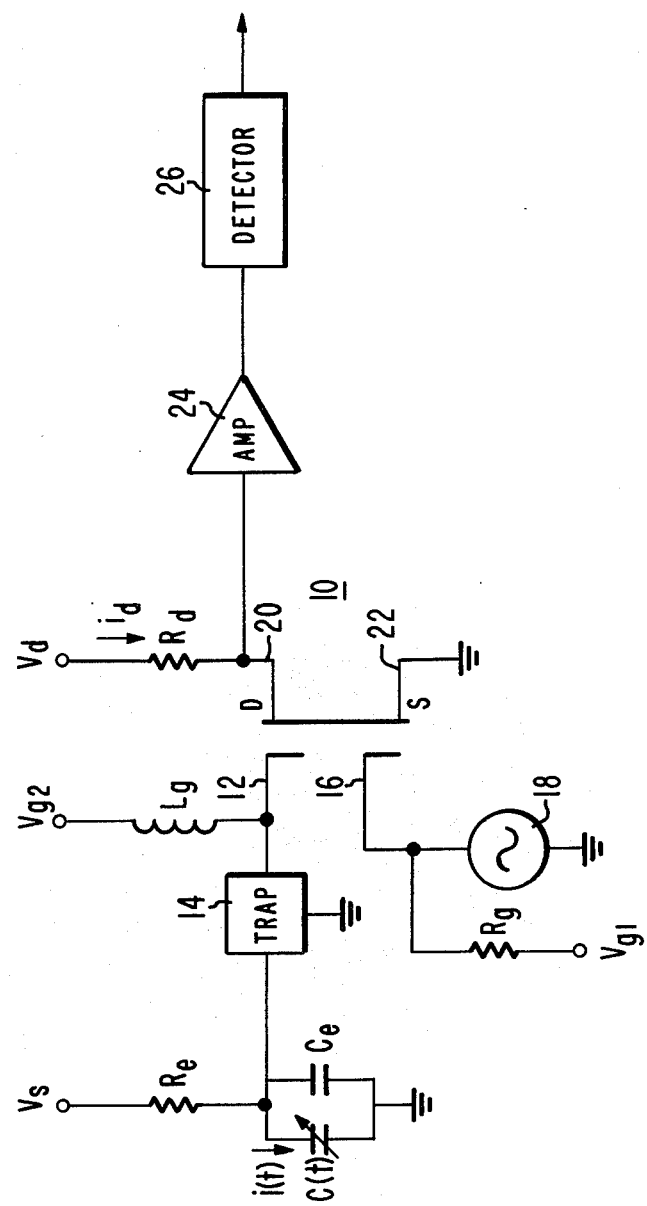

PICKUP CIRCUIT FOR VIDEO DISC INCLUDING DUAL-GATE FET WITH INJECTED RF

The present invention relates generally to pickup circuitry for use in a disc record player and, more particularly, to pickup circuitry for use in a capacitive video disc player such as, for example, the type described in U.S. Pat. No. 3,842,194 issued to J. K. Clemens.

In the Clemens patent, a video disc playback system of a variable capacitance form is disclosed. In one configuration of a Clemens type video disc, information representative of recorded picture and sound is encoded as geometric (i.e., relief) variations in the bottom of a relatively narrow spiral groove on the surface of a disc record. For example, the groove may be 2.5 micrometers wide and 0.5 micrometers deep. Illustratively, the information signal is recorded over a frequency band of several megahertz. During playback, a pickup stylus engages the spiral groove as the disc record is rotated by a turntable. Capacitance variations between a conductive electrode on the pickup stylus and a conductive property of the disc record surface are sensed to recover the information recorded on the disc.

A system for converting the capacitance variations between the pickup electrode and the disc groove bottom to a voltage variation is described in a U.S. Patent Application filed concurrently herewith for J. J. Gibson. In accordance with one embodiment of the Gibson pickup, an insulated-gate field-effect transistor is used to detect the disc-stylus electrode capacitance variations directly. In this system, the conductive electrode on the stylus is d.c. biased and the FET is used to sense the baseband signal recorded on the disc surface. For small signal analysis, the front end of the Gibson pickup circuit may be represented by a current source (i.e., the varying capacitance biased by a d.c. source) in parallel with a capacitor. The gate voltage of the FET, which is the voltage across the gate capacitance of the device, varies in consonance with variations in the disc-stylus electrode capacitance.

In accordance with one preferred embodiment of Clemens, the video signal which occupies a bandwidth of three megahertz is recorded on a high frequency picture carrier of 5 MHz with frequency deviations of 4.3–6.3 megahertz and the sound signal is recorded on a low frequency sound carrier of 716 KHz±deviations of 50 KHz. One potential problem for an FET pickup which is used to detect a baseband signal recorded according to the Clemens format is the low frequency noise of the device. Most insulated-gate field-effect transistors tend to generate noise at lower frequencies. The low frequency noise spectrum is inversely proportional to the frequency, i.e., "1/f" noise. This low frequency device noise may adversely affect the operation of the pickup.

Another potential problem for a baseband pickup wherein the baseband signal is recorded at the frequencies of the preferred Clemens embodiment is that the frequency at which the audio is recorded coincides with the A.M. broadcast band. If a number of conditions are met (such as frequency, power level, directivity and location), outside radiation from, say, A.M. broadcast can have an adverse effect on the playback operation of the video disc system.

The present invention provides pickup circuitry which reduces or eliminates the player's susceptibility to the low frequency noise of the pickup device and to radiation from external sources. These advances are achieved by using a dual-gate field-effect transistor. In accordance with the principles of the present invention, a pickup circuit is provided wherein the conductive electrode of the playback stylus is coupled to one gate of the dual-gate FET and a local oscillator is coupled to the other gate of the dual-gate FET. In this arrangement, the dual-gate field-effect transistor detects the recorded signal as variations in the capacitance between the conductive electrode and the disc and mixes the detected information signal with the local oscillator signal to effect a frequency conversion. By using this technique the local oscillator frequency may be chosen such that the low-frequency noise of the FET is outside of the band of interest and susceptibility to noise from external sources may be reduced or eliminated.

Other features and advantages of the invention will be more fully understood from the following detailed description of the preferred embodiment, the appended claims and the accompanying drawing in which the FIGURE shows, partly via block diagram representation, a pickup system in accordance with the principle of the present invention.

Referring to the FIGURE, a field-effect transistor pickup circuit is shown. The circuit includes a dual insulated-gate field-effect transistor 10 connected in a common source configuration. Gate electrode 12 of transistor 10 is coupled via trap 14 to the electrode of the stylus. The capacitance between the stylus electrode and the video disc is illustrated in the FIGURE as the parallel combination of capacitors C(t) and $C_e$. The capacitance between the stylus and the disc may be represented by a fixed capacitance, for example, $C_e$, illustratively $C_e$ may be on the order of 0.5 pf for typical video disc systems, and a time varying capacitance, C(t), illustratively the time varying capacitance is on the order of $10^{-4}$ pf. The stylus electrode is biased with a d.c. voltage $V_s$ which may be on the order of 12 volts.

Gate electrode 16 is coupled to a local oscillator 18 which provides a signal of a frequency $f_o$. Illustratively gate electrodes 16 and 12 are biased with a voltages $V_{g1}$ and $V_{g2}$ of approximately 2 volts respectively. The drain electrode 20 of transistor 10 is connected via drain load resistor $R_d$ to bias potential $V_d$ which may be on the order of 8 volts. The source electrode 22 is connected to a point of reference potential (e.g., ground). Drain electrode 20 is also connected to the input side of amplifier 24 which in turn is coupled to detector 26 (i.e., demodulator). The output of detector 26 is coupled to suitable circuitry for processing the recorded information. Reference may be made, for example, to U.S. Pat. No. 3,969,756 issued to R. C. Palmer et al. for a general description of suitable processing circuitry.

The operation of the dual-gate field-effect transistor pickup will now be explained. During playback the stylus capacitance (C(t)+$C_e$) is fed with a d.c. voltage $V_s$. As C(t) varies with time in response to relief variations in the groove bottom of the video disc during playback, an alternating current i(t) flows through the capacitor C(t) equal to:

$$i(t) = V_s \frac{dC(t)}{dt} \quad (1)$$

For small signal analysis, the front end of the pickup circuit may be represented by a current source (i.e., the current through capacitor C(t)) in parallel with capacitor $C_e$ which, in turn, is in parallel with the gate capacitance $C_g$ of gate 12. Therefore, the gate voltage of FET 10 is the voltage across the gate capacitance provided the impedance of trap 14 at the signal frequencies is negligable. The gate voltage $V_g$ is the integral of the current is the sum of the capacitances, or:

$$V_g = \frac{1}{C_e + C_g} \int^t V_s dC(t) = \frac{C(t) V_s}{C_e + C_g} \qquad (2)$$

The current $i_d$ flowing through transistor 10 is amplitude modulated by the signals applied to gate electrodes 12 and 16. The current $i_d$ provides a voltage across resistor $R_d$ at the drain electrode of transistor 10 which varies in consonance with the geometric variations in the groove bottom mixed with the local oscillator frequency. Illustratively, if the oscillator frequency is chosen to be 20 MHz, the current which flows through resistor $R_d$ will contain components having an upper sideband extending from 20.666 to 29.3 MHz in accordance with the preferred Clemens format. Amplifier 24 further amplifies the signal output of transistor 10. The modulated signal from amplifier 24 is delivered to detector 26 where it is converted again to the baseband signal which is present on the disc. Illustratively, amplifier 24 and detector 26 may be tuned to the upper sideband frequencies generated by transistor 10. The baseband signal output may be delivered to the signal processing circuitry of the video disc player.

Generally, transistor 10 provides excellent isolation to the local oscillator. It reduces local oscillator feedthrough to the virtual antenna between the stylus and the disc surface. However, in those cases where the isolation is not sufficient a rejection filter 14 (i.e., notch filter) may be positioned between transistor 10 and the stylus capacitance to trap out the signal from local oscillator 18.

What is claimed is:

1. In a video disc playback system for use in recovering an information signal recorded in a first given frequency band along an information track on a surface of a record disc, said information being recorded as variations in the geometry of said information track, an apparatus comprising:
a stylus having a conductive electrode, said stylus being adapted to track said information track, said conductive electrode sensing signals which vary in accordance with variations in the capacitance between said electrode and a conductive property of said information track said capacitance variations corresponding to variations in the geometry of said information track;
a dual-gate field-effect transistor having a first gate of said dual-gate transistor coupled to said conductive electrode; and
a source of radio frequency signals coupled to a second gate of said dual-gate transistor;
said dual-gate field-effect transistor detecting said variations in capacitance and mixing said detected variations in capacitance with said radio frequency signals from said source to provide an output signal of a second given frequency band.

2. The apparatus in accordance with claim 1 wherein said first given frequency band is several megahertz wide.

3. The apparatus in accordance with claim 2 wherein said conductive electrode of said stylus is biased by a direct current potential of a given polarity.

4. The apparatus in accordance with claim 3 further comprising:
a notch filter, interposed between said conductive electrode and said first gate, for blocking the passage of said radio frequency signals to said stylus.

5. The apparatus in accordance with claim 3 further comprising:
a demodulator for demodulating said output signal from said dual-gate transistor to provide an information signal in said first given frequency band.

6. In a video disc playback system for use in recovering an information signal recorded in a first given frequency band along a spiral groove on a surface of a record disc, said information being recorded as variations in the geometry of said groove bottom, an apparatus comprising:
a stylus having a conductive electrode, said stylus being adapted to engage said spiral groove, said conductive electrode providing a first conductor of a sensing capacitor and a conductive surface of said groove bottom providing a second conductor of said sensing capacitor;
means for establishing relative motion between said stylus and said spiral groove;
said conductive electrode providing an information signal in accordance with variations in capacitance formed between said conductive electrode and said spiral groove during said relative motion, said information signal being representative of the information recorded in said spiral groove;
an oscillator providing a radio frequency signal of a given frequency; and
a dual-gate field-effect transistor having a first gate coupled to said conductive electrode and having a second gate coupled to said oscillator, said dual-gate transistor detecting said information signal provided by said conductive electrode and mixing said radio frequency signal with said detected information signal to provide an output signal in a second given frequency band.

7. The apparatus according to claim 6 further comprising:
a notch filter, interposed between said conductive electrode and said first gate, for filtering out said radio frequency signal of a given frequency.

8. The apparatus according to claim 6 further comprising:
a demodulator for demodulating the output signal in said second given frequency band to provide an information signal in said first given frequency band.

* * * * *

UNITED STATES PATENT AND TRADEMARK OFFICE
CERTIFICATE OF CORRECTION

PATENT NO. : 4,450,550
DATED : 5/22/84
INVENTOR(S) : Fred Sterzer

It is certified that error appears in the above—identified patent and that said Letters Patent is hereby corrected as shown below:

Column 3, line 6, "is" should be --in--.

Signed and Sealed this

Ninth Day of October 1984

[SEAL]

Attest:

GERALD J. MOSSINGHOFF

Attesting Officer

Commissioner of Patents and Trademarks